United States Patent [19]

Nowak et al.

[11] Patent Number: 5,047,153

[45] Date of Patent: Sep. 10, 1991

[54] METHOD FOR REMOVING AMINE FROM SOLIDS

[75] Inventors: James C. Nowak, Kent; Mark K. Tose, Maple Valley, both of Wash.

[73] Assignee: Resources Conservation Company, Bellevue, Wash.

[21] Appl. No.: 430,768

[22] Filed: Oct. 31, 1989

[51] Int. Cl.$^5$ ............................................. B01D 17/05
[52] U.S. Cl. .................................... 210/634; 134/25.1; 134/29; 134/30; 210/708; 210/710; 210/737; 210/771; 252/344; 252/358
[58] Field of Search ..................... 134/25.1, 26, 29, 30, 134/34, 35, 37; 210/634, 639, 708, 709, 710, 737, 738, 768, 770, 771; 252/344, 329, 358

[56] References Cited

U.S. PATENT DOCUMENTS

| | | | |
|---|---|---|---|
| 3,348,599 | 10/1967 | Lohstoeter et al. | 210/771 |
| 3,365,395 | 1/1968 | McDonald | 210/770 |
| 3,744,543 | 7/1973 | Emmett et al. | 210/771 |
| 3,835,114 | 9/1974 | Hunt et al. | 260/233.3 R |
| 3,875,054 | 4/1975 | Hunt et al. | 210/10 |
| 3,899,419 | 8/1975 | Emanuel | 210/10 |
| 3,901,878 | 8/1975 | Hunt et al. | 210/10 |
| 3,925,201 | 12/1975 | Ames | 210/10 |
| 3,962,079 | 6/1976 | Hunt et al. | 210/10 |
| 4,002,562 | 1/1977 | Ames et al. | 252/377 |
| 4,056,466 | 11/1977 | Peters | 210/10 |
| 4,087,513 | 5/1978 | Schell | 423/437 |
| 4,254,250 | 3/1981 | Glowaky et al. | 525/350 |
| 4,260,489 | 4/1981 | Greig et al. | 210/771 |
| 4,328,366 | 5/1982 | Winslow, Jr. et al. | 562/513 |
| 4,358,381 | 11/1982 | Takeuchi et al. | 210/727 |
| 4,444,654 | 4/1984 | Cargle et al. | 208/188 |
| 4,481,072 | 11/1984 | Grudinin et al. | 162/16 |
| 4,769,157 | 9/1988 | Bassler et al. | 210/758 |
| 4,792,406 | 12/1988 | Allenson et al. | 210/734 |
| 4,793,936 | 12/1988 | Lefrancois | 210/729 |
| 4,830,754 | 5/1989 | Nowak et al. | 210/639 |
| 4,863,607 | 9/1989 | Andrew et al. | 210/634 |

*Primary Examiner*—Peter Hruskoci
*Attorney, Agent, or Firm*—Seed and Berry

[57] ABSTRACT

A method for reducing the residual amine content of dried solids by adding water to the dried solids to form a wetted solids mixture and drying the wetted solids mixture to yield a dried product with a final amine content less than the residual amine content of the dried solids. An alkaline composition is also disclosed which further reduces the final amine content of the dried product.

48 Claims, 2 Drawing Sheets

METHOD FOR REMOVING AMINE FROM SOLIDS

TECHNICAL FIELD

The present invention relates generally to a process for removing amine from solids, and more specifically to a process for removing residual amine from dried solids produced by the dewatering of sludges or breaking of oil-water emulsions containing solid matter using an amine having an inverse critical solution temperature with water.

BACKGROUND OF THE INVENTION

Solids often contain residual amounts of amine. For example, waste solids from processes using amine solvents to extract organic products from reaction streams, solids formed as by-products in the production of triethylamine or other amines, and solids produced in amine-solvent de-oiling processes may contain residual amounts of amine.

In addition to the solids identified above, solids containing residual amounts of amines are produced in processes for dewatering sludges or breaking oil-water emulsions which contain solid matter. For example, a process for dewatering sludges containing solid matter and water using an amine or amine mixture having an inverse critical solution temperature is described in U.S. Pat. No. 3,899,419 to Emanuel, incorporated herein by reference. Improvements on the Emanuel process are disclosed in U.S. Pat. No. 3,925,201 to Ames, U.S. Pat. No. 4,056,466 to Peters, and U.S. Pat. No. 4,830,754 to Nowak et al., each of which are incorporated herein by reference.

In Emanuel, U.S. Pat. No. 3,899,419, a sludge is mixed with an amine or mixture of amines having an inverse critical solution temperature with water. At a temperature below the inverse critical solution temperature of the amine, the water will dissolve in the amine. The solid matter in the sludge can then be removed to leave a more or less single-phase mixture. Increasing the temperature of the singe-phase mixture above the inverse critical temperature of the amine results in the formation of a two-phase system: a water component containing residual amine, and an amine component containing residual water. These two phases can then be separated, thus achieving the desired dewatering of the sludge. The solid matter removed in such a process may subsequently be dried to yield a dried solids material. This material, however, contains a residual amount of amine due to the extraction technique.

Ames, U.S. Pat. No. 3,925,201, discloses a method for minimizing the residual amine in both the solid matter and in the water component by adding an alkaline composition to the sludge before addition of the amine. In practice, however, the addition of the alkaline composition to the sludge before the addition of amine leads to increased viscosity of the sludge, making mixing and pumping of the sludge difficult. This problem was addressed in U.S. Pat. No. 4,830,754 to Nowak et al., incorporated herein by reference. In Nowak et al., U.S. Pat. No. 4,830,754, an alkaline composition is added to the sludge coincident with the step of mixing the sludge with the amine in an amount sufficient to remove substantially all of residual amine from the solid matter.

A related technique is disclosed in U.S. Pat. No. 4,002,562 to Ames et al., incorporated herein by reference, wherein a method for breaking emulsions containing oil, water and solid matter is taught. According to the process of Ames et al., U.S. Pat. No. 4,002,562, an amine or mixture of amines having an inverse critical solution temperature with water is added to the emulsion at a temperature below the inverse critical solution temperature. Any solid matter present in the emulsion can then be separated by a variety of known techniques such as centrifugation or filtration. After separation of the solid matter, the remaining mixture is a more or less homogeneous mixture of water, oil and amine. When the temperature of the water-oil-amine mixture is then raised above the inverse critical solution temperature of the amine, two phases are produced: a water phase containing a small amount of amine, and an oil-amine phase containing a small amount of water. These phases may then be separated to achieve separation of the original emulsion. The solid matter removed in such a process may subsequently be dried to yield a dried solids material which contains a residual amount of amine.

Dried solids of the types discussed above contain residual amounts of amine in varying quantities. Such residual amine, however, is undesirable because of environmental concerns associated with the disposal of such solids in, for example, landfills. In addition, due to the relatively strong odor of many amines, residual amine content in solids has been found undesirably noxious.

Accordingly, there is a need in the art for a method of reducing the residual amine contained in solid matter. In addition, there is a need in the art to reduce the residual amine content in the dried solids produced by the processes for dewatering sludges or breaking oil-water emulsions containing solid matter using an amine having an inverse critical solution temperature with water.

BRIEF SUMMARY OF THE INVENTION

It is an object of the present invention to provide a method for reducing the residual amine content of solid matter containing residual amine.

It is a further object of the present invention to provide a method for reducing the residual amine content of dried solid matter produced in the dewatering of sludges using an amine having an inverse critical solution temperature with water.

Still a further object of the present invention is to provide a method for reducing the residual amine content of dried solid matter produced in the breaking of oil-water emulsions which contain solid matter using an amine having an inverse critical solution temperature with water.

Briefly stated, one embodiment of the present invention provides a method for reducing the residual amine content of solids by admixing the solids with an effective amount of water to form a wetted solids mixture, and drying the wetted solids mixture to produce a dried product with a final amine content less than the residual amine content of the solids.

In another embodiment, the present invention provides an improvement of the processes for dewatering sludges or breaking oil-water emulsions containing solid matter using an amine or mixture of amines having an inverse critical solution temperature with water. Such sludges and emulsions may contain, in varying amounts, water, solid matter and oil. The amine or mixture of amines may be selected from the group of amines having the general formula:

where $R_1$ is hydrogen or alkyl; $R_2$ and $R_3$ are alkyl radicals having from one to six carbon atoms or alkenyl radicals having from two to six carbon atoms; and the total number of carbon atoms in the molecule is in the range from three to seven, inclusive. One example of such amine is triethylamine (TEA).

Where it is desired to dewater a sludge containing water and solid matter, the sludge is mixed with an amine or a mixture of amines having an inverse critical solution temperature with water to form a mixture, where the mixture has a temperature below the inverse critical solution temperature of the amine. At a temperature below the inverse critical solution temperature the water is completely miscible in the amine. The solid matter can then be separated by known separation methods and dried to yield a dried solid matter containing residual amine. The temperature of the remaining water-amine mixture may then be raised above the inverse critical solution temperature of the amine to form a water component containing a small amount of amine, and an amine component containing a small amount of water. These two phases may then be separated by know methods, such as stripping. If the sludge contains oil, such oil will remain in the amine component. In addition, an alkaline composition may be added to the sludge prior to or during the mixing of the sludge and amine in an amount sufficient to lower the residual amine content of the dried solid matter.

Where it is desired to break an oil-water emulsion containing solid matter, the emulsion is mixed with an amine or a mixture of amines having an inverse critical solution temperature with water to form a single-phase water-oil-amine mixture, where the single-phase mixture has a temperature below the inverse critical solution temperature of the amine. The solid matter may then be separated by known separation techniques and dried to yield a dried solid matter containing residual amine. When the temperature of the single-phase mixture is increased above the inverse critical solution temperature of the amine, a two-phase system results: a water component containing a small amount of amine, and an oil-amine component containing a small amount of water. The water component may then be separated from the oil-amine component by physical separation methods, such as decanting. The small amount of amine in the water component may be removed by known methods such as stripping. Similarly, the oil-amine component, containing a small amount of water, may be processed to recover the amine. In addition, an alkaline composition may be added to the emulsion prior to or during the step of mixing the emulsion and amine in an amount sufficient to lower the residual amine content of the dried solid matter.

The alkaline composition is selected from a group which includes lithium hydroxide, sodium hydroxide, potassium hydroxide, calcium hydroxide, magnesium hydroxide and lithium, sodium, potassium, calcium or magnesium salt of a weak acid.

The present invention is an improvement to the processes of dewatering sludges or breaking emulsions using an amine having an inverse critical solution temperature with water, and includes the further steps of mixing the dried solid matter with an effective amount of water to form a wetted solids mixture and drying the wetted solids mixture to produce a dried product having a final amine content less than the residual amine content of the dried solid matter.

In another embodiment of the present invention, a further improvement to the processes of dewatering sludges or breaking emulsions using an amine having an inverse critical solution temperature with water is the addition of an alkali composition to either the water, the dried solid matter, or the wetted solids mixture in an amount sufficient to further reduce the final amine content of the dried product. The alkaline composition is selected from the same group described above.

In still a further embodiment of the present invention, water is added to the dried solid matter in the form of steam addition during the drying step. The steam serves to wet the dried solid matter to form a wetted solids mixture, and may optionally be used as a source of heat for purposes of drying.

These and other aspects of the present invention will become evident upon reference to the following detailed description and attached drawings.

DETAILED DESCRIPTION OF THE INVENTION

The present invention discloses a process for lowering the amine content of solids which contain residual amounts of amine, such as waste solids from processes using amine solvents to extract organic products from reaction streams, solids formed as by-products in the production of triethylamine or other amines, and solids produced in amine-solvent de-oiling processes.

The term "residual amine" is defined herein to include amines or mixtures of amines present in the solid matter in the range of from about 0.01% to about 1.0% by weight of the dry solid.

A further example of solids which contain residual amine are those produced in a process for dewatering sludges or breaking oil-water emulsions containing solid matter using an amine having an inverse critical solution temperature with water. In such a process, an amine is selected from a group of amines having the general formula:

where $R_1$ is hydrogen or alkyl; $R_2$ and $R_3$ are alkyl radicals having from one to six carbon atoms or alkenyl radicals having from two to six carbon atoms; and the total number of carbon atoms in the molecule is in the range of from three to seven. An example of such an amine is triethylamine (TEA).

The amines used to dewater or break sludges and emulsions exhibit an inverse critical solution temperature with water. At a temperature below the inverse critical solution temperature, water is completely miscible with the amine. However, at a temperature above the inverse critical solution temperature, water is not miscible with the amine. For example, triethylamine exhibits an inverse critical solution temperature with water at atmospheric pressure at approximately 18.7° C.

Where it is desired to dewater a sludge containing water and solid matter, the sludge is mixed with an amine or a mixture of amines having an inverse critical solution temperature with water to form a mixture, where the mixture has a temperature below the inverse critical solution temperature of the amine. At a temperature below the inverse critical solution temperature the water is completely miscible in the amine. The solid matter can then be separated by known separation methods and dried to yield a dried solid matter containing residual amine. Temperature of the remaining water-amine mixture may then be raised above the inverse critical solution temperature of the amine to form a water component containing a small amount of amine, and an amine component containing a small amount of water. These two phases may then be separated by know methods, such as stripping. If the sludge contains oil, such oil will remain in the amine component. In addition, an alkaline composition may be added to the sludge prior to or during the mixing of the sludge and amine in an amount sufficient to lower the residual amine content of the dried solid matter.

Where it is desired to break an oil-water emulsion containing solid matter, the emulsion is mixed with an amine or a mixture of amines having an inverse critical solution temperature with water to form a single-phase water-oil-amine mixture, where the single-phase mixture has a temperature below the inverse critical solution temperature of the amine. The solid matter may then be separated by know separation techniques and dried to yeild a dried solid matter containing residual amine. When the temperature of the single-phase mixture is increased above the inverse critical solution temperature of the amine, a two-phase system results: a water component containing a small amount of amine, and an oil-amine component containing a small amount of water. The water component may then be separated from the oil-amine component by physical separation methods, such as decanting. The small amount of amine in the water component may be removed by known methods such as stripping. Similarly, the oil-amine component, containing a small amount of water may then be processed to recover the amine. In addition, an alkaline composition may be added to the emulsion prior to or during the step of mixing the emulsion and amine in an amount sufficient to lower the residual amine content of the dried solid matter.

The alkaline composition is selected from the group which includes lithium hydroxide, sodium hydroxide, potassium hydroxide, calcium hydroxide, magnesium hydroxide and lithium, sodium, potassium, calcium or magnesium salt of a weak acid.

As mentioned above, solid matter contained in the sludge or emulsion is separated from the single-phase mixture by standard separation techniques, such as centrifugation or filtration. In addition, the solids may be washed with additional amine in order to further reduce oil or other organic contaminates in the solid matter. The wet solids separated in such a process contain an amount of amine ranging from about 5% to about 200% by weight of the wet solids. The amount of amine contained in the wet solids may be subsequently reduced by drying. Such drying lowers the amine content to a residual level ranging from about 0.01% to about 1.0% by weight of the dried solids.

Figure 1:
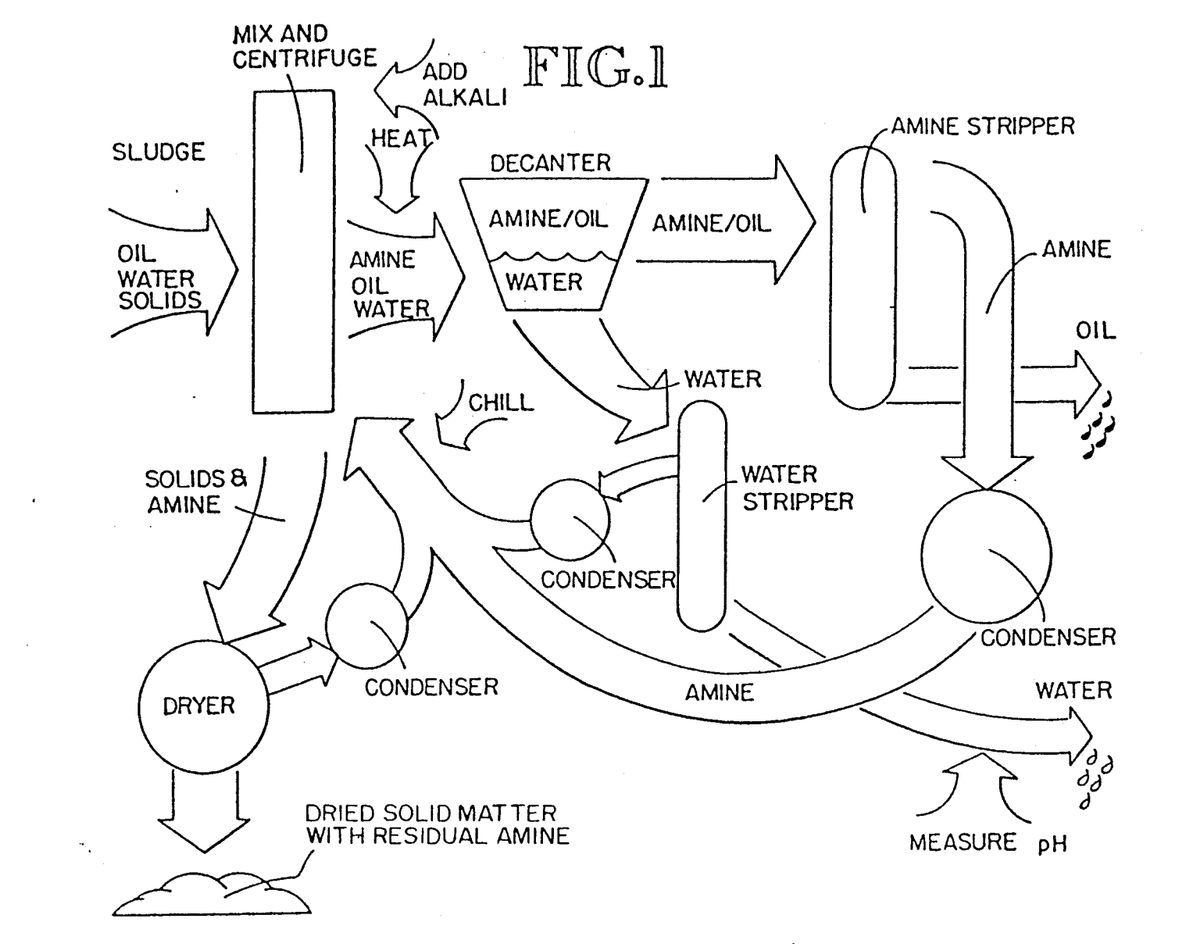
FIG. 1 is a schematic depiction of a prior art production of a dried solid matter containing residual amine in the dewatering of a sludge containing oil, water, and solids using an amine having an inverse critical solution temperature with water.

Referring to FIG. 1, a prior art generation of a dried solid matter containing residual amine is schematically illustrated. A sludge containing oil, water and solid matter is cooled to a temperature below the inverse critical solution temperature of the amine to be used in the separation process. In a mixing tank, the sludge is mixed with the amine, and at the same time, an alkali is added to the sludge and amine mixture. The entire mixture is maintained at a temperature below the inverse critical solution temperature of the amine to allow all water and oil to dissolve in the amine. At this point, the mixing tank contains solid matter, plus a single-phase mixture of water, oil and amine. The solid matter is then separated by standard techniques and dried to leave a dried solid matter containing residual amine. Further drying of the solid matter does not reduce the residual amine content of the solid.

The present invention permits the further reduction in the residual amine content of solid matter such as, for example, the dried solid matter generated in the process schematically illustrated in FIG. 1. The present invention involves the further treatment of the solid matter with water to generate a wetted solids mixture. The wetted solids mixture is then dried to produce a dried product with a final amine content less than the residual amine content of the dried solid matter.

The first step of the process of the present invention includes thoroughly mixing the previously dried, or partially dried, solids containing residual amine with water. Mixing equipment may be any one of several types commonly used in industry for mixing solids and liquids, such as ribbon mixers, paddle mixers, screw rotating drum mixers and the like.

The effective amount of water mixed with the dried solids may range from approximately 2% to 200% by weight of the solids, and preferably from 4% to 100% by weight of the solids. While the proportion of water may be greater than 100% by weight of the dry solids, significant reduction of residual amine content is not achieved, and the expenditure of additional energy to remove the water is economically undesirable.

The second step of the process includes drying the wetted solids mixture in any of various types of drying equipment, such as rotating drum dryers, compartment dryers, screw conveyor dryers and the like. Such drying may be done in either a batch or continuous manner. For batch drying, a preferable temperature and drying time is 105° C. for 24 hours. The drying temperature, however, must be at least equal to, or greater than, the boiling point of the water-amine azeotrope component. For example, with triethylamine, the drying temperature must be at least approximately 83° C. The amine and water vapors from the drying step may, if desired, be collected and either destroyed by, for example, incineration, or condensed and recycled.

Figure 2:
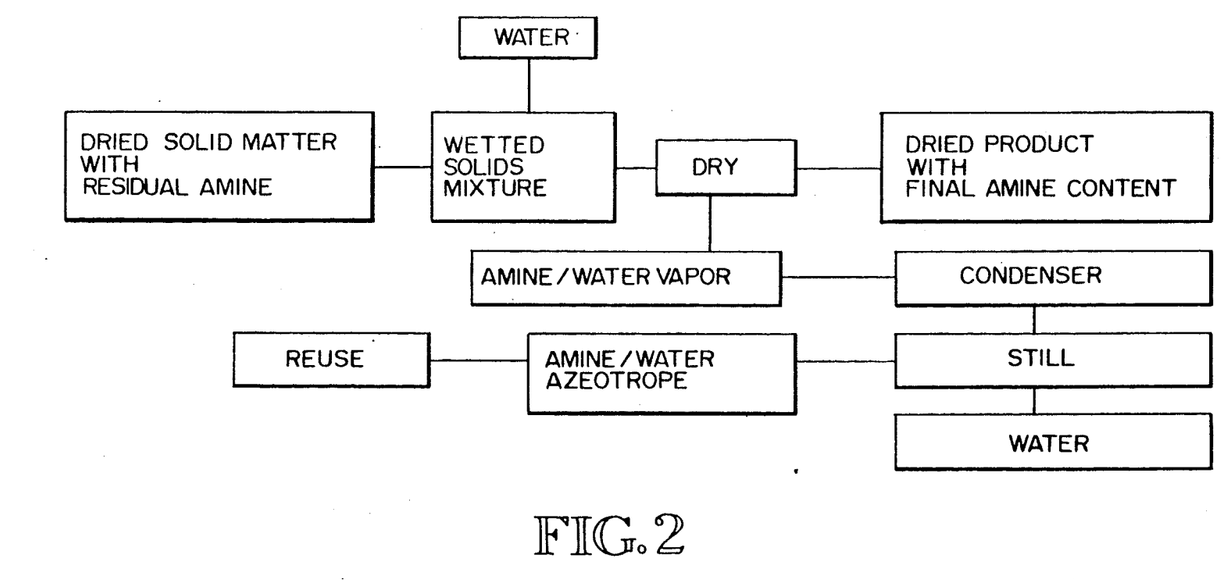
FIG. 2 is a schematic depiction of the treatment of dried solid matter with water to form a wetted solids mixture, followed by the drying of the wetted solids mixture to produce a dried product with a final amine content less than the residual amine content of the dried solid matter. This schematic also depicts the recycling of the amine/water vapor produced during the drying step.

Referring to FIG. 2, a schematic illustration of the present invention is depicted. The dried solid matter containing residual amine is first mixed with water to form a wetted solids mixture. The wetted solids mixture is then dried to produce a dried product with a final amine content less than the residual amine content of the dried solid matter prior to treatment. The amine/water vapor may optionally be collected, condensed and distilled to recycle the water and amine components of the vapor.

By use of the present invention, the residual amine content of the dried solid matter may be reduced as much as 90-95% percent. A slight additional improvement in the reduction in amine content may be achieved by addition of an effective amount of an alkaline composition to either the dried solid matter or the water used to wet the dried solid matter. Alternatively, the alkaline composition may be added to the wetted solids mixture after the dried solid matter and water are mixed.

The alkaline composition is selected from the group which includes lithium hydroxide, sodium hydroxide, potassium hydroxide, calcium hydroxide, magnesium hydroxide and lithium, sodium, potassium, calcium or magnesium salt of a weak acid. For example, using sodium hydroxide as the alkaline composition, a preferred effective amount of sodium hydroxide ranges from about 0.1% to about 5% by weight of the dried solid matter. If alkaline compositions other than sodium hydroxide are used, a preferred effective amount would approximate the caustic power of sodium hydroxide in the weight range specified above. Thus, if potassium hydroxide or calcium hydroxide were used instead of sodium hydroxide, the weight percent of the alkaline composition would be 140% (for potassium hydroxide) and 92% (for calcium hydroxide) the weight percent of sodium hydroxide.

In an alternative embodiment of the present invention, the steps of mixing and drying can occur simultaneously using equipment known in the art, commonly referred to as mixer/dryer equipment. In addition, both the water addition and drying may be accomplished by introducing live steam to the mixer/dryer drum. A high proportion of this steam condenses and provides the liquid water for wetting the solids as well as providing heat for drying.

Mixing may be accomplished by any of several means known in the art, including rotating the mixer/dryer drum, or by rotating paddles inside the drum or by other means. The mixer/dryer may be jacketed so that steam or other heating fluids may be introduced to the jacket thus heating and drying the solids after injection of live steam in the drum either as a batch process or, as the solids move through the mixer/dryer, downstream of the injection of live steam.

The production of the initially dried solids may also be accomplished in the mixer/dryer either on a batch mode basis or on a continuous basis in a zone upstream from the zone where the present invention is practiced.

The following examples are set forth to better enable one of ordinary skill in the art to reproduce the invention as described above. These examples are intended to be illustrative and are not intended in any manner to limit the invention described and claimed herein.

EXAMPLE I

Two samples (i.e., Samples A and B) of dried solid containing residual amine were produced by the process illustrated in FIG. 1. Sample A and Sample B were found to have a residual amine concentration of 590 ppm and 1300 ppm, respectively.

Both samples were redried at 105° C. for 24 hours, resulting in no further reduction of residual amine content. However, with the addition of water in the amount of 100% by weight of dried solids both samples showed a substantial further decrease in amine content. Specifically, the amine content of Sample A was found to have dropped from 590 ppm to 55 ppm (i.e., a 91% reduction), and the amine content of Sample B was found have dropped from 1300 ppm to 500 ppm (i.e., a 62% reduction).

EXAMPLE II

Sludges containing a mixture of water, oil and solid matter were collected from various sources and treated by the method of U.S. Pat. No. 3,925,201 to Ames. The solids produced thereby were dried and found to contain residual amounts of both amine and oil. Various amounts of water, ranging from 0% by weight of the dried solids (i.e., control) to 100% by weight of the dried solids, was then mixed with the dried solids to produce a wetted solids mixture. The wetted solid mixture was then dried at 105° C. for 24 hours. The results of this experiment is summarized in Table 1.

TABLE 1

| Sample | Oil Content | Water Addition | Amine Content (ppm) |
|---|---|---|---|
| 1 | 0.12 | 0% | 600 |
|   |   | 25% | 400 |
|   |   | 50% | 200 |
|   |   | 100% | 60 |
| 2 | 0.12 | 0% | 700 |
|   |   | 100% | 100 |
| 3 | 0.07 | 0% | 960 |
|   |   | 100% | 320 |
| 4 | 0.12 | 0% | 1000 |
|   |   | 100% | 220 |
| 5 | 0.03 | 0% | 120 |
|   |   | 100% | 78 |
| 6 | 0.1 | 0% | 400 |
|   |   | 100% | 50 |
| 7 | 0.1 | 0% | 400 |
|   |   | 100% | 100 |
| 8 | 0.8 | 0% | 200 |
|   |   | 100% | 60 |
| 9 | 0.06 | 0% | 150 |
|   |   | 100% | 90 |

Referring to Table 1, sample 1 illustrates that a 90% reduction in residual amine content occurred with the addition of water in an amount equal to 100% by weight of the dried solids. With the addition of water in an amount equal to 25% and 50% by weight of the dried solids, a 33% and 67% reduction was observed, respectively.

EXAMPLE III

In this experiment, a further reduction of residual amine content was observed with the addition of an alkaline composition. Samples 1 through 5 of Example II were further treated with sodium hydroxide in a ratio equal to 2 milliliters of 50% sodium hydroxide to 10 grams of dry solid. The sodium hydroxide was added concurrently with the addition of the water to the dried solids and mixed. The results of this experiment are given in Table 2.

TABLE 2

| Sample | Water Addition | Amine Content (ppm) |
|---|---|---|
| 1 | 0% | 600 |
|   | 100% | 60 |
|   | 100% + NaOH | 30 |
| 2 | 0% | 700 |

TABLE 2-continued

| Sample | Water Addition | Amine Content (ppm) |
|---|---|---|
|   | 100% | 100 |
|   | 100% + NaOH | 62 |
| 3 | 0% | 960 |
|   | 100% | 320 |
|   | 100% + NaOH | 290 |
| 4 | 0% | 1000 |
|   | 100% | 220 |
|   | 100% + NaOH | 150 |
| 5 | 0% | 120 |
|   | 100% | 78 |
|   | 100% + NaOH | 66 |

Referring to Table 2, the final amine content following treatment by the present invention with 100% by weight water may be further reduced with the addition of an alkaline composition.

EXAMPLE IV

In this example live steam was used to effect the removal of amine from solids. Testing in pilot scale equipment has shown that addition of live steam during the drying cycle is an efficient method of amine reduction. A series of tests were conducted on soil samples where the solids were saturated with triethylamine (the soil concentration of amine was in excess of 25% by weight of the amine-wetted solids, i.e., 250,000 ppm). The amine-wetted solids were dried producing a dried solids component containing residual amine.

The dried solids were contained in a vessel which provided agitation by means of rotating paddles and also allowed for the addition of direct steam. Direct steam was then added to the dried solids component during agitation. The steam addition was continued until the temperature of the overhead vapor increased to the temperature of the steam (i.e., approximately 100° C.). The steam was applied for an additional ten minutes so that the solids contained approximately 16-21% water by weight of the dried solids. The solids were then removed from the vessel and tested for triethylamine (TEA) concentration. The results of this experiment are summarized below:

TABLE 3

| Test | Moisture % | Residual TEA (ppm) |
|---|---|---|
| 1 | 17 | 160 |
| 2 | 18 | 520 |
| 3 | 16 | 94 |
| 4 | 17 | 110 |
| 5 | 21 | 160 |
| 6 | 16 | 150 |

From the foregoing, it will be appreciated that, although embodiments of the invention have been described herein for purposes of illustration, various modifications may be made without deviating from the spirit and scope of the invention. Accordingly, the invention is not limited except as by the appended claims.

We claim:

1. In a process for dewatering a sludge containing solid matter and water including the steps of:
   admixing said sludge with a secondary or tertiary amine to form a mixture, said amine having the general formula wherein
$R_1$ is hydrogen or alkyl,
$R_2$ and $R_3$ are alkyl radicals having from one to six carbon atoms or alkenyl radicals having from two to six carbon atoms, and
the total number of carbon atoms in the molecule being in the range of from three to seven, inclusive, said amine having an inverse critical solution temperature in a two phase system with water,
maintaining the temperature of said mixture below the inverse critical solution temperature of said amine to yield a single phase liquid containing said amine and water and a solid phase containing at least a portion of said solid matter which is insoluble in said single phase liquid and separating said solid phase from said single phase liquid, and
drying said separated solid phase to yield a dried solid matter, said dried solid matter containing a residual amount of said amine ranging from about 0.01% to about 1.0% by weight of said dried solid matter.
the improvement comprising:
admixing said dried solid matter with an effective amount of liquid water to form a wetted solids mixture, wherein said effective amount of liquid water ranges from about 2% to about 200% by weight of said dried solid matter; and
drying said wetted solids mixture to produce a dried product with a final amine content less than the residual amine content of said dried solid matter.

2. The process of claim 1 wherein the effective amount of water ranges from about 4% to about 100% by weight of said dried solid matter.

3. The process of claim 1 wherein the effective amount of water ranges from about 20% to about 100% by weight of said dried solid matter.

4. The process of claim 1 wherein the residual amine content of said dried solid matter ranges from about 0.01% to about 0.5% by weight of said dried solid matter.

5. The process of claim 1 wherein the final amine content of said dried product ranges from about 0.003% to about 0.1% by weight of said dried product.

6. The process of claim 1 wherein said wetted solids mixture is dried at a temperature ranging from about 90° C. to about 250° C, for a period of time ranging from about 15 minutes to about 36 hours.

7. The process of claim 1 further comprising:
prior to admixing said dried solid matter with said water, admixing said dried solid matter with an alkaline composition in an amount effective to further reduce the final amine content of said dried product.

8. The process of claim 7 wherein said alkaline composition is selected from the group consisting essentially of lithium hydroxide, sodium hydroxide, potassium hydroxide, calcium hydroxide, and a lithium, sodium or postassium salt of a weak acid.

9. The process of claim 7 wherein said alkaline composition is sodium hydroxide, and the effective amount is in the range from about 0.1% to about 5% by weight of said dried solid matter.

10. The process of claim 1 further comprising:
prior to admixing said dried solid matter with said water, admixing said water with an alkaline composition in an amount effective to further reduce the final amine content of said dried product.

11. The process of claim 10, wherein said alkaline composition is selected from the group consisting essentially of lithium hydroxide, sodium hydroxide, potassium hydroxide, calcium hydroxide, and a lithium, sodium or potassium salt of a weak acid.

12. The process of claim 10 wherein said alkaline composition is sodium hydroxide, and the effective amount is in the range from about 0.1% to about 5% by weight of said dried solid matter.

13. The process of claim 1 further comprising:
prior to drying said wetted solids mixture, admixing said wetted solids mixture with an alkaline composition in an amount effective to further reduce the final amine content of said dried product.

14. The process of claim 13 wherein said alkaline composition is selected from the group consisting essentially of lithium hydroxide, sodium hydroxide, potassium hydroxide, calcium hydroxide, and a lithium, sodium or potassium salt of a weak-acid.

15. The process of claim 13 wherein said alkaline composition is sodium hydroxide, and the effective amount is in the range from about 0.1% to about 5% by weight of said dried solid matter.

16. The process of claim 1 wherein said liquid water mixed with said dried solid matter is added in the form of condensed steam.

17. In a process for breaking an oil-water emulsion containing solid matter including the steps of:
admixing said oil-water emulsion with a secondary or tertiary amine to form a mixture, said amine having the general formula.

wherein
$R_1$ is hydrogen or alkyl,
$R_2$ and $R_3$ are alkyl radicals having from one to six carbon atoms or alkenyl radicals having from two to six carbon atoms and
the total number of carbon atoms in the molecule being in the range of from three to seven, inclusive, said amine having an inverse critical solution temperature in a two phase system with water,
maintaining the temperature of said mixture below the inverse critical solution temeperature of said amine to yield a single phase liquid containing said amine, oil and water and a solid phase containing at least a portion of said solid matter which is insoluble in said single phase liquid and separating said solid phase from said single phase liquid, and
drying said separated solid phase to yield a dried solid matter, said dried solid matter containing a residual amount of said amine ranging from about 0.01% to about 1.0% by weight of said dried solid matter. the improvement comprising:
admixing said dried solid matter with an effective amount of liquid water to form a wetted solids mixture, wherein said effective amount of liquid water ranges from about 2% to about 200% by weight of said dried solid matter; and
drying said wetted solids mixture to produce a dried product with a final amine content less than the residual content of said dried solid matter.

18. The process of claim 17 wherein the effective amount of water ranges from about 4% to about 100% by weight of said dried solid matter.

19. The process of claim 17 wherein the effective amount of water ranges from about 20% to about 100% by weight of said dried solid matter.

20. The process of claim 17 wherein the residual amine content of said dried solid matter ranges from about 0.01% to about 0.5% by weight of said dried solid 21. The process of claim 17 wherein the final amine content of said dried product ranges from about 0.003% to about 0.1% by weight of said dried product.

22. The process of claim 17 wherein said wetted solids mixture is dried at a temperature ranging from about 90° C., for a period of time ranging from 15 minutes to about 36 hours.

23. The process of claim 17 further comprising:
prior to admixing said dried solid matter with said water, admixing said dried solid matter with an alkaline composition in an amount effective to further reduce the final amine content of said dried product.

24. The process of claim 23 wherein said alkaline composition is selected from the group consisting essentially of lithium hydroxide, sodium hydroxide, potassium hydroxide, calcium hydroxide, and a lithium, sodium or potassium salt of a weak acid.

25. The process of claim 23 wherein said alkaline composition is sodium hydroxide, and the effective amount is in the range from about 0.1% to about 5% by weight of said dried solid matter.

26. The process of claim 17 further comprising:
prior to admixing said dried solid matter with said water, admixing said water with an alkaline composition in an amount effective to further reduce the final amine content of said dried product.

27. The process of claim 26 wherein said alkaline composition is selected from the group consisting essentially of lithium hydroxide, sodium hydroxide, potassium hydroxide, calcium hydroxide, and a lithium, sodium or potassium salt of a weak acid.

28. The process of claim 26 wherein said alkaline composition is sodium hydroxide, and the effective amount is in the range from about 0.1% to about 5% by weight of said dried solid matter.

29. The process of claim 17 further comprising:
prior to drying said wetted solids mixture, admixing said wetted solids mixture with an alkaline composition in an amount effective to further reduce the final amine content of said dried product.

30. The process of claim 29 wherein said alkaline composition is selected from the group consisting essentially of lithium hydroxide, sodium hydroxide, potassium hydroxide, calcium hydroxide, and a lithium, sodium or potassium salt of a weak acid.

31. The process of claim 29 wherein said alkaline composition is sodium hydroxide, and the effective amount is in the range from about 0.1% to about 5% by weight of said dried solid matter.

32. The process of claim 17 wherein said liquid water mixed with said dried solid matter is added in the form of condensed steam.

33. A process for reducing the amine content of dried solids having a residual amine content, comprising:
admixing said dried solids with an effective amount of liquid water to form a wetted solids mixture, wherein said effective amount of liquid water ranges from about 2% to about 200% by weight of said dried solids, and wherein said residual amine content ranges from about 0.01% to about 1.0% by weight of said dried solids; and
drying said wetted solids mixture to produce a dried product with a final amine content less than the residual amine content of said dried solids.

34. The process of claim 33 wherein the effective amount of water ranges from about 4% to about 100% by weight of said solids.

35. The process of claim 33 wherein the effective amount of water ranges from about 20% to about 100% by weight of said solids.

36. The process of claim 33 wherein the residual amine content of said solids range from about 0.01% to about 5% by weight of said solids.

37. The process of claim 33 wherein the final amine content of said dried product ranges from about 0.003% to about 0.1% by weight of said dried product.

38. The process of claim 33 wherein said wetted solids mixture is dried at a temperature ranging from about 90° C. to about 250° C., for a period of time ranging from about 15 minutes to about 36 hours.

39. The process of claim 33 further comprising:
prior to admixing said solids with said water, admixing said solids with an alkaline composition in an amount effective to further reduce the final amine content of said dried product.

40. The process of claim 39 wherein said alkaline composition is selected from the group consisting essentially of lithium hydroxide, sodium hydroxide, potassium hydroxide, calcium hydroxide, and a lithium, sodium or potassium salt of a weak acid.

41. The process of claim 39 wherein said alkaline composition is sodium hydroxide, and the effective amount is in the range from about 0.1% to about 5% by weight of said dried solid matter.

42. The process of claim 33 further comprising:
prior to admixing said solids with said water, admixing said water with an alkaline composition in an amount effective to further reduce the final amine content of said dried product.

43. The process of claim 42 wherein said alkaline composition is selected from the group consisting essentially of lithium hydroxide, sodium hydroxide, potassium hydroxide, calcium hydroxide, and a lithium, sodium or potassium salt of a weak acid.

44. The process of claim 42 wherein said alkaline composition is sodium hydroxide, and the effective amount is in the range from about 0.1% to about 5% by weight of said dried solid matter.

45. The process of claim 33 further comprising:
prior to drying said wetted solids mixture, admixing said wetted solids mixture with an alkaline composition in an amount effective to further reduce the final amine content of said dried product.

46. The process of claim 45 whereinsaid alkaline composition is selected from the group consisting essentiallyh of lithium hydroxide, sodium hydroxide, potassium hydroxide, calcium hydroxide, and a lithium, sodium or potassium salt of a weak acid.

47. The process of claim 45 wherein said alkaline composition is sodium hydroxide, and the effective amount is in the range from about 0.1% to about 5% by weight of said dried solid matter.

48. The process of claim 33 wherein said liquid water mixed with said dried solids is added in the form of condensed steam.

* * * * *

UNITED STATES PATENT AND TRADEMARK OFFICE
CERTIFICATE OF CORRECTION

PATENT NO. : 5,047,153

DATED : September 10, 1991

INVENTOR(S) : James C. Nowak; Mark K. Tose

It is certified that error appears in the above-identified patent and that said Letters Patent is hereby corrected as shown below:

In column 12, claim 20, line 16, after "solid" please insert -- matter. --.

In column 12, claim 22, line 22, after "90°C" please insert -- to about 250°C. --.

In column 14, claim 46, line 27, please delete "whereinsaid" and substitute therefor -- wherein said --.

Signed and Sealed this

Nineteenth Day of January, 1993

Attest:

DOUGLAS B. COMER

Attesting Officer

Acting Commissioner of Patents and Trademarks